United States Patent [19]
Moore et al.

[11] 3,905,033
[45] Sept. 9, 1975

[54] SINGLE COMPOSITE PULSE MOVING TARGET INDICATOR RADAR SYSTEM

[75] Inventors: Thomas A. Moore, Rockville, Md.; Frank R. Castella, Norristown, Pa.

[73] Assignee: The United States of America as represented by the Secretary of the Navy, Washington, D.C.

[22] Filed: Apr. 10, 1968

[21] Appl. No.: 721,137

[52] U.S. Cl............................. 343/7.7; 343/17.2 PC
[51] Int. Cl.²....................... G01S 9/233; G01S 9/42
[58] Field of Search............. 343/7.7, 17.2, 17.2 PC

[56] References Cited
UNITED STATES PATENTS

| | | |
|---|---|---|
| 3,225,349 | 12/1965 | Thor ...................... 343/17.2 PC X |
| 3,229,284 | 1/1966 | Rubin ...................... 343/17.2 PC X |
| 3,290,679 | 12/1966 | Branlt et al. ................. 343/17.2 PC |

Primary Examiner—Malcolm F. Hubler
Attorney, Agent, or Firm—R. S. Sciascia; J. A. Cooke

[57] ABSTRACT

A radar system transmits a single composite pulse having up and down sweep frequency components and target reflected pulses which are processed in a pulse compression arrangement. Signals reflected from moving targets result in processed pulses that move apart in time to produce an output indicative of a moving target; signals from stationary targets or clutter do not separate in time and are cancelled producing no output.

4 Claims, 6 Drawing Figures

INVENTORS
Thomas A. Moore
Frank R. Castella

BY J.O. Tresansky
ATTORNEY $\Delta\tau > t_r \qquad \Delta\tau = t_r \qquad \Delta\tau = \tfrac{1}{2} t_r \qquad \Delta\tau = \tfrac{1}{10} t_r$

SINGLE COMPOSITE PULSE MOVING TARGET INDICATOR RADAR SYSTEM

BACKGROUND OF THE INVENTION

The invention relates generally to radar systems, and more particularly to a single composite pulse moving target indicating radar system.

An MTI radar system is capable of distinguishing between fixed objects and moving objects by utilizing the doppler effect wherein the radar signal echo received from a moving object is changed in phase due to the radial velocity of the object. Fixed objects, however, introduce no phase change in the radar echo, thus fixed and moving objects may be distinguished.

Prior art systems have employed coherent phase detectors or a two-pulse technique to detect moving targets. In the first mentioned system, a coherent oscillator provides a reference signal, in-phase with the transmitted signal, that is compared with the echo signal. One disadvantage of such systems is that the subclutter visibility for targets in clutter which has relative motion from pulse to pulse is relatively poor. In addition, "blind-speeds" exists at which no MTI output is produced. "Blind-speeds" occur when the object moves toward or away from the radar system a distance equal to an integral number of half wavelengths of the transmitter carrier frequency during the interval between pulses.

In the prior art two pulse systems, the doppler shift between the two pulses of a group are utilized to detect moving targets. A disadvantage of two-pulse systems is the relative motion of scatterers over the time interval between pulses. Also, these systems require using delay lines.

SUMMARY OF THE INVENTION

Accordingly, one object of the invention is to provide an improved MTI system.

Another object of the present invention is the provision of an MTI radar system having an improved subclutter visibility for targets in moving clutter.

Still another object of the instant invention is to provide a simplified MTI radar system.

Yet another object of the instant invention is to provide a single composition pulse MTI radar system.

These and other objects are attained by providing an MTI radar system that transmits a single composite pulse having an up sweep and a down sweep frequency component and a received signal processing channel that compresses the up sweep and down sweep frequency components in separate circuit paths, subtracting the resultant signals to provide an output when moving targets are encountered.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
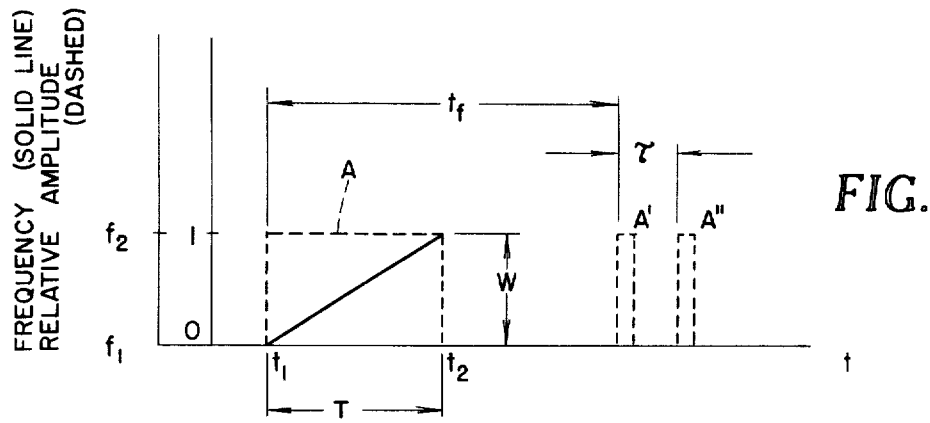
FIGS. 1–4 are graphical views showing various signals in conjunction with the system of the invention.

With reference to FIG. 1 single rectangular pulse A is shown having a pulse width T extending from $t_1$ to $t_2$ with a relative amplitude of 1 unit between $t_1$ and $t_2$ and being linearly swept over a sweep width W from an initial frequency $f_1$ at $t_1$ upward to a second frequency $f_2$ at $t_2$. By applying pulse A to a conventional pulse compression filter network having the proper characteristics for the frequency sweep W, the pulse may be delayed a time $t_f$ and "stacked-up" in time to yield a compressed pulse A'. In effect, the filter provides a frequency dependent delay, delaying $f_1$ more than $f_2$ and frequencies between $f_1$ and $f_2$ proportionally, for example. If pulse A is transmitted by a radar system, reflected by a stationary target, and processed in a receiver having a pulse compression filter as described hereinbefore, a compressed pulse A' will be produced (ignoring the round-trip radar-target distance time). However, if a moving target is encountered by the transmitted radar signal, an additional time offset occurs to produce displaced pulse A''. The time offset $\tau$ may be expressed $\tau = f_d\, T/W$, where $f_d$ is the conventional doppler frequency ($f_d = 2v/\lambda$). For different doppler frequencies the compressed pulse will stack up at a different time corresponding to a different target velocity. A received pulse will also be offset in time due to the elapsed time for the signal to reach the target and return; thus this additional offset is a function of target range.

Figure 2:
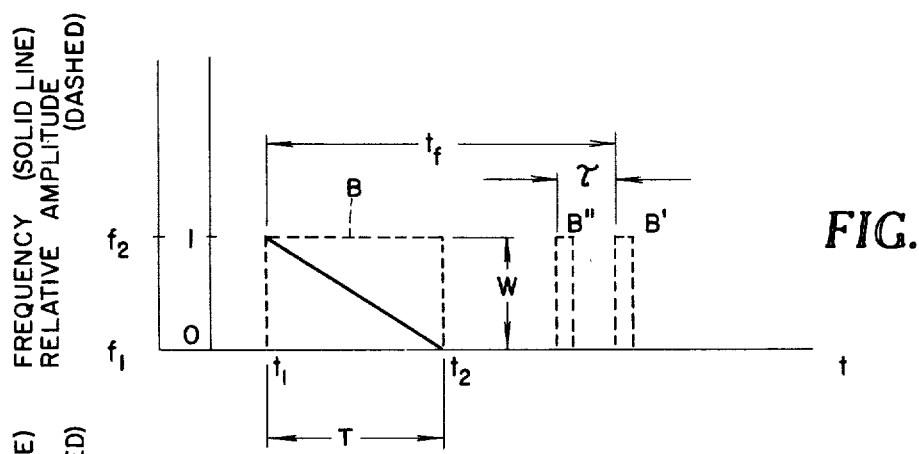

In FIG. 2, a similar pulse B is shown, differing in that the frequency slope is the negative of pulse A, that is, it is a "down sweep" instead of an "up sweep". A pulse compression filter similar to that of the example in FIG. 1 will "stack" up pulse B to yield compressed pulse B'. However, when reflected from a moving target, the pulse offset $\tau$ is negative and the pulse will move to the left on the time axis, in addition to the target range offset.

Figure 3:
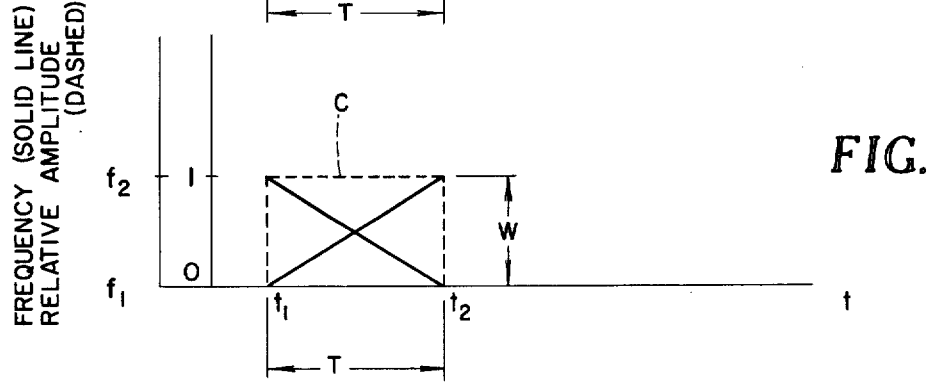
Figure 4:
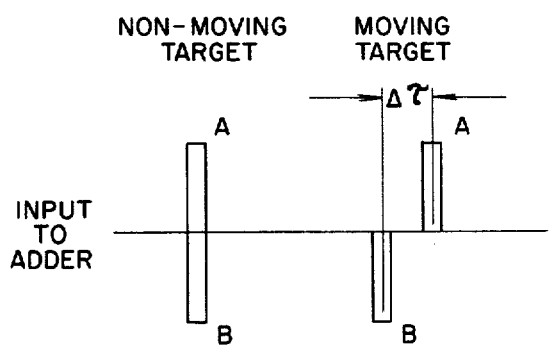

Referring now to FIG. 3, a composite pulse C may be formed composed of pulses A and B. If pulse C is reflected from a target and properly processed so as to "stack-up" the up and down frequency components, two compressed pulses will be produced in time coincidence. By inverting one of the pulses, zero output will be obtained as shown in FIG. 4. However, as further shown in FIG. 4, if the target is moving the two pulses will move apart a time $\Delta\tau$ which may be expressed $$\Delta\tau = 2f_d\, T/W.$$

By rectifying the pulses shown an MTI output is provided. Since non-moving targets or clutter will provide the same delay to the A and B components of pulse C due to the range, returns from such targets will be cancelled in the processing circuitry and no output obtained.

Figure 5:
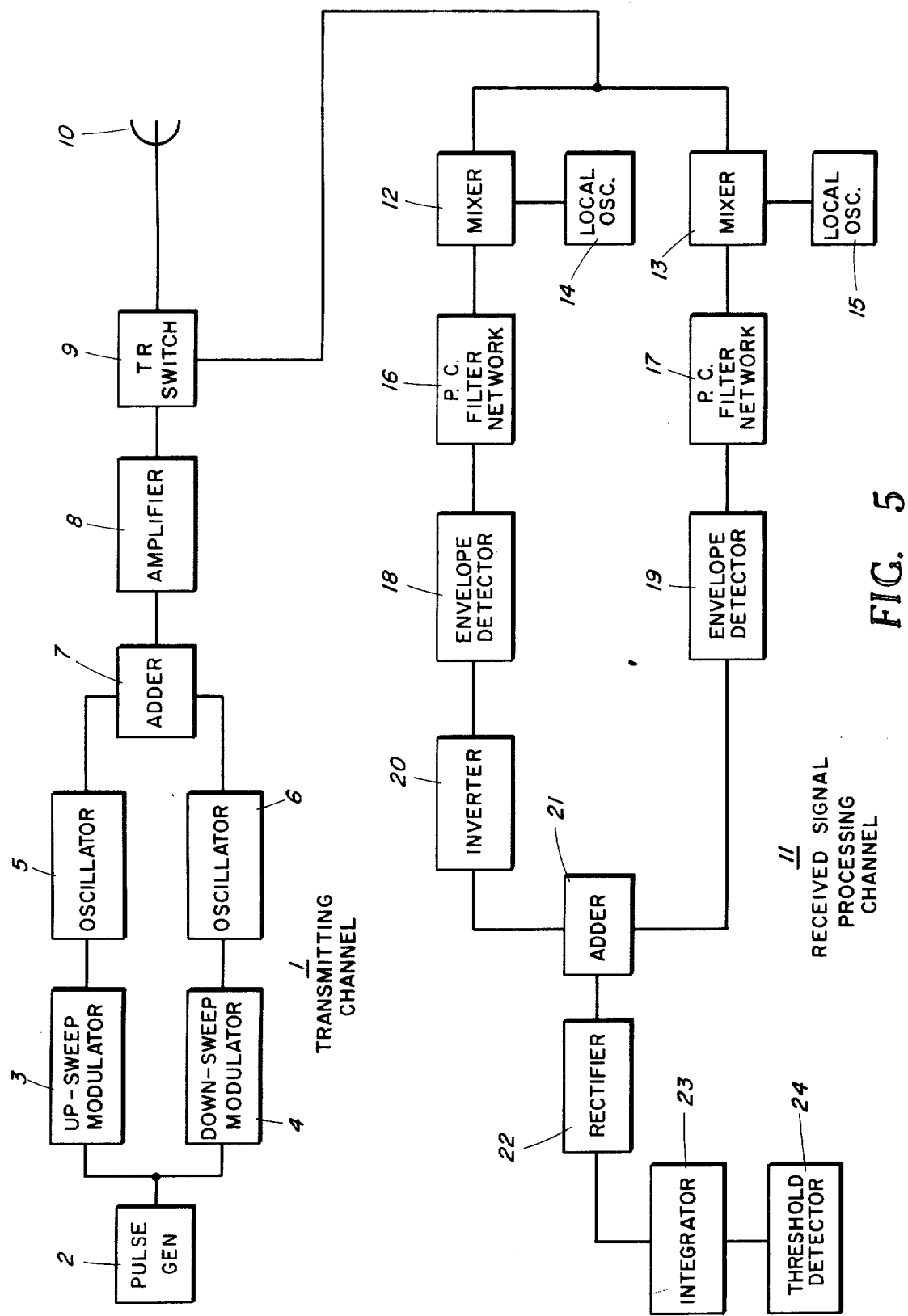
FIG. 5 is a block diagrammatical view of the MTI single composite pulse radar system according to the present invention.

Referring now to FIG. 5, a block diagram of a MTI single composite pulse radar system employing the afore-discussed underlying physical principles is shown as including a transmitting channel 1 which generates composite pulse C having up and down sweep components as shown in FIG. 3. The transmitting channel includes a pulse generator 2 simultaneously connected to an up sweep modulator 3 and a down sweep modulator 4. Modulators 3 and 4 are respectively coupled to r.f.

oscillators 5 and 6 and control the operations thereof. The pulse generator, modulators, and oscillators may be of any conventional type, arranged to provide two simultaneous pulses, A and B, of length T with linear frequency sweeps over a frequency range $f_1$ to $f_2$ and $f_2$ to $f_1$, respectively, as shown in FIGS. 1 and 2. Alternatively, certain types of non-linear frequency sweeping may be used, for example logarithmic or hyperbolic sweeping, and if these are employed certain modifications to the received signal processing channel must be made as described hereinafter.

Oscillators 5 and 6 are connected to an adder 7 which combines the outputs of the oscillators to provide a single composite pulse C which, in turn, is fed to a conventional amplifier 8. When a pulse output is present a TR switch 9 connects the amplifier output to a directional antenna 10 to transmit the composite pulse C. During non-transmitting periods the TR switch 9 connects antenna 10 to a received signal processing channel 11. Reflected echo signals received by antenna 10 are simultaneously applied to a pair of mixers 12 and 13 individually connected to a respective one of local oscillators 14 and 15. Local oscillator 14 is operating at the frequency $f_c - f_{i.f.}$ (lower sideband) and local oscillator 15 is operating at the frequency $f_c + f_{i.f.}$ (upper sideband). The polarity of the output from mixer 12 is normal but that from mixer 13 is inverted, that is, the sweep components of the received pulses are inverted. The mixer outputs may therefore be processed in identical conventional pulse compression filters 16 and 17 individually coupled to mixers 12 and 13, respectively. Filter 16 condenses and delays the up sweep frequency component and suppresses the down sweep frequency component while filter 17 condenses and delays the down sweep frequency component and suppresses the up sweep frequency component. Each filter is, therefore, a filter matched to the desired input frequency sweep and mismatched to the undesired input frequency sweep. Such filters are considered to be well known in the art. Filters 16 and 17 are individually connected to respective ones of a pair of envelope detectors 18 and 19 which receive the compressed pulses from the filters. An inverter 20 is coupled to detector 18 to invert the output thereof and then both detector signals are applied to an adder 21 to provide the MTI output. FIG. 4 shows typical input signals to adder 21. It will be readily appreciated by those skilled in the art that, alternatively, a subtractor may be provided instead of an inverter and adder. Further processing of the detected signal may include rectification of the MTI output by a rectifier 22 coupled to adder 21 and integration over several prf cycles by an integrator 23 coupled to rectifier 22 followed by a device for sensing the integrator output such as a threshold detector 24.

In the event that non-linear frequency sweeping is used, appropriate changes must be made in the characteristics of the pulse compression filters 16 and 17.

If desired pulse compression filters 16 and 17 may be non-identical filters if a single local oscillator and mixer is used. In that case the same mixer output would be applied to each filter. It will be apparent that one filter will have inverted characteristics of the other. Design and production of such filters are known in the prior art and is not considered a part of this invention.

Figure 6A:
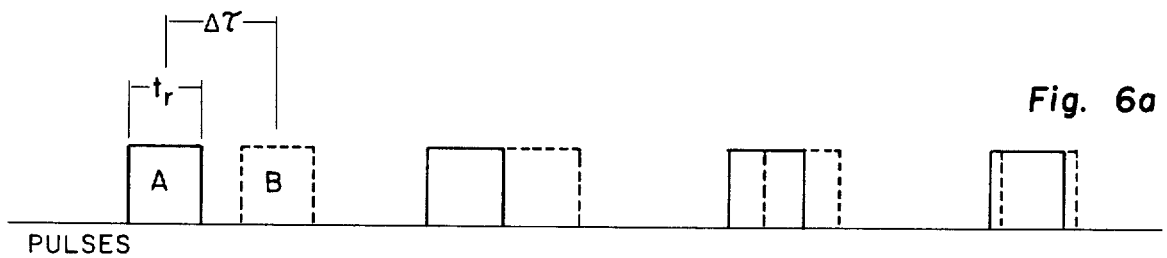
FIG. 6 is a further graphical view showing signals received with the system of the instant invention.
Figure 6B:
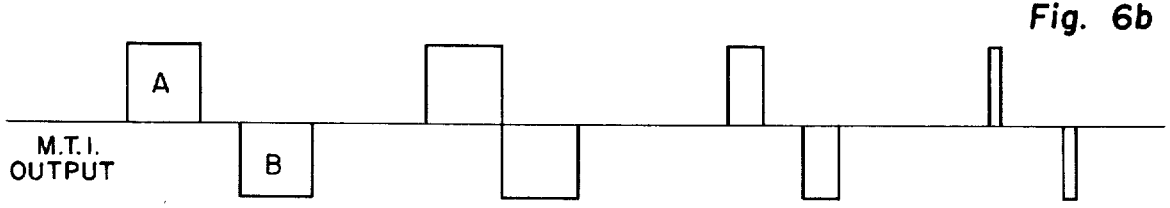
Figure 6C:
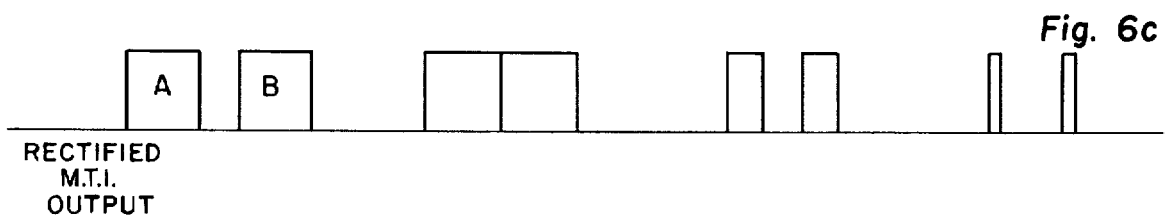

Detection of targets in clutter depends on the resolution capability of the processing circuit, the length of the transmitted pulse, the carrier frequency of the transmitted pulse, the doppler frequency of the return signal and, to a laser extent, numerous other factors. FIGS. 6a–c show the effect of $\Delta \tau$ (the time spread between processed pulses resulting from target motion, on the MTI output.) It is apparent that there exists a minimum doppler frequency below which MTI detection is not possible. The following table gives exemplary data for a radar system operated at a reduced range efficiency of 56%.

| $f_d$ -min | T | $f_c$ 1 Gc (L-band) | $f_c$ 3 Gc (S-band) | $f_c$ 5 Gc (C-band) | $f_c$ 10 Gc (X-band) |
|---|---|---|---|---|---|
| 10 kc | 5 μsec | 2860 knots | 950 knots | 570 knots | 286 knots |
| 5 kc | 10 μsec | 1430 knots | 475 knots | 285 knots | 143 knots |
| 2.5 kc | 20 μsec | 720 knots | 240 knots | 142 knots | 72 knots |
| 1 kc | 50 μsec | 290 knots | 95 knots | 58 knots | 29 knots |
| .5 kc | 100 μsec | 145 knots | 48 knots | 29 knots | 15 knots |
| .25 kc | 200 μsec | 72 knots | 24 knots | 14 knots | 7 knots |
| .1 kc | 500 μsec | 29 knots | 9.5 knots | 5.8 knots | 2.9 knots |

The radar system described provides significant improvement in subclutter visibility over two-pulse MTI systems wherein the scatterers change position from pulse to pulse. In addition, the single composite pulse feature eliminates blind speeds.

Obviously, numerous modifications and variations of the present invention are possible in light of the above teachings. For example, the pulse shape may be Gaussian instead of rectangular so as to minimize the effect of pulse compression sidelobes. It is therefore to be understood that within the scope of the appended claims the invention may be practiced otherwise than as specifically described herein.

What is claimed as new and desired to be secured by Letters Patent of the United States is:

1. A single composite pulse MTI radar system comprising in combination
    means for transmitting single composite radar pulses of length T at a predetermined pulse repetition frequency, said pulses being simultaneously composed of a first component having a frequency sweep from $f_1$ to $f_2$ over the pulse length T and a second component having a frequency sweep from $f_2$ to $f_1$ over the pulse length T,
    means for receiving target reflected pulses and for processing said pulses including a pair of pulse compression filter means for providing compressed pulses of said first and second pulse components in separate circuit paths, and
    means for subtracting said processed pulses whereby a signal output is produced only for pulses reflected from moving targets.

2. The system of claim 1 wherein said frequency sweeps are linear over the period T.

3. The system of claim 1 further comprising
means for rectifying said subtracted signals to provide rectified signals,
means for integrating said rectified signals to provide a voltage, and
threshold means for detecting the amplitude level of said voltage.

4. A single composite pulse MTI radar system for transmitting pulses of r.f. energy and for receiving target reflected pulses comprising in combination
oscillator means for generating an r.f. signal,
means for linearly frequency modulating said oscillator means from a first frequency $f_1$ to a second frequency $f_2$, constituting an up sweep modulation,
further oscillator means for generating an r.f. signal,
means for linearly frequency modulating said further oscillator means from a first frequency $f_2$ to a second frequency $f_1$, constituting a down sweep modulation;
pulse generator means for operating said up sweep and down sweep modulator means during repetitive pulse intervals $t_1$ to $t_2$,
means for adding the outputs of said r.f. signal oscillator means whereby a single composite pulse having up sweep and down sweep modulation components is simultaneously produced,
means for amplifying said single composite r.f. pulse,
antenna means for transmitting said single composite r.f. pulse and for receiving a target reflected echo of said single composite r.f. pulse,
means for connecting said amplifier means to said antenna means,
a first mixer having two inputs and an output,
first local oscillator means for providing a signal at the lower side band frequency of said single composite r.f. pulse,
means for applying said first local oscillator means signal and said target reflected pulse to said first mixer inputs,
a second mixer having two inputs and an output,
second local oscillator means for providing a signal at the upper sideband frequency of said single composite r.f. pulse,
means for applying said second local oscillator signal and said target reflected pulse to said second mixer inputs,
first and second pulse compression filter means connected to the outputs of said first and second mixers, respectively, for providing separate compressed pulse outputs representative of said composite pulse to up sweep and down sweep modulation components and for substantially simultaneously suppressing said down sweep and up sweep modulation components, respectively,
first and second means connected to said first and second filter means, respectively, for envelope detecting said compressed pulses,
means for inverting one of said detected pulses, and
means for adding said inverted and non-inverted pulses whereby a signal output representative of a moving target is provided.

\* \* \* \* \*